United States Patent [19]

Morgen

[11] 4,054,760
[45] Oct. 18, 1977

[54] REMOTE TESTING OF TELEPHONE LOOPS

[75] Inventor: Dennis Howard Morgen, Verona, N.J.

[73] Assignee: Bell Telephone Laboratories, Incorporated, Murray Hill, N.J.

[21] Appl. No.: 709,256

[22] Filed: July 28, 1976

[51] Int. Cl.² .............................................. H04M 1/24
[52] U.S. Cl. ................................ 179/175.2 B; 179/175
[58] Field of Search .......... 179/175.2 B, 175, 175.3 R; 324/60 CD

[56] References Cited

U.S. PATENT DOCUMENTS

| | | | |
|---|---|---|---|
| 3,410,966 | 11/1968 | Davies | 179/175.3 R |
| 3,822,367 | 7/1974 | Humphrey | 179/175.3 R |
| 3,870,837 | 3/1975 | Adams et al. | 179/175.2 B |
| 3,889,073 | 6/1975 | Hoppough et al. | 179/175.2 B |

Primary Examiner—Douglas W. Olms
Attorney, Agent, or Firm—Robert O. Nimtz

[57] ABSTRACT

A telephone subscriber loop testing system is disclosed which can be used for performing standard ringer continuity, noise, leakage, short circuit, and foreign voltage tests over exceptionally long subscriber loops. The sensitivity of the ringer ballistic test is enhanced by placing the reversing switch (which serves to discharge the line) at a location remote from the central office test desk and relatively near to the subscriber station.

In one embodiment, the remote ballistic test circuit is incorporated in a remote testing system for a group of subscriber lines connected to the central office through a carrier system. In this embodiment, a separate metallic test path is provided to the remote location which can be selectively connected to any one of a plurality of subscriber loops for such testing.

8 Claims, 3 Drawing Figures

REMOTE TESTING OF TELEPHONE LOOPS

BACKGROUND OF THE INVENTION

1. Field of the Invention

This invention relates to testing telephone subscriber loops and, more particularly, to ballistic testing of subscriber ringers connected to extremely long subscriber loops.

2. Description of the Prior Art

The conventional procedure for sensing the presence or absence of bridged ringers at the end of a telephone customer loop is by securing an indication proportional to the total line capacitance. A telephone ringer presents a substantial capacitance across the telephone line and, not only can the presence of such a ringer be detected by a capacitance measurement, but the number of such ringers on any telephone line can similarly be detected.

A measure of the total line capacitance is obtained by alternately charging and discharging the telephone line from a test battery and noting the ballistic deflection of a milliammeter measuring the resulting currents. On normal telephone lines, this procedure is adequate to detect the presence of a ringer on the line and, in many cases, to ascertain the number of ringers bridged on the particular line.

The sensitivity of the ballistic ringer test decreases with increasing loop length due to the increase in capacitance associated with the telephone line itself. It is estimated that the limit for accurately detecting the presence of a telephone ringer on the line using this method is about twenty miles. This limitation is of no concern on telephone loops in urban and suburban areas since the lengths of such loops fall well within this limit.

On longer rural loops, however, and particularly those which require some form of carrier system to transmit voice signals, the limit is often exceeded and reliable ringer continuity tests using the ballistic procedure cannot be accomplished. Alternate means for testing ringers in loops of great length involve expensive remote testing devices in which the information controlling the tests and reporting the test results must be transmitted between the central office location and the remote testing location by alternating current tones. One such tone-controlled testing arrangement is disclosed in C. R. Davies U.S. Pat. No. 3,410,966, granted Nov. 12, 1968. Tone-controlled testing arrangements, however, are expensive, bulky, and complex, leading to higher costs and lower reliability.

SUMMARY OF THE INVENTION

The difficulties encountered in performing ballistic ringer tests over long subscriber loops are overcome in the present invention by remoting the reversing switch used to discharge the line, moving the reversing switch to a location far removed from the central office and relatively close in proximity to the subscriber station. Using this arrangement, the reversing switch need discharge only that portion of the subscriber loop which is beyond the reversing switch. The sensitivity of the ballistic ringer test is therefore almost totally independent of the length of the loop. Ballistic ringer tests can therefore be provided over extremely long telephone loops using the standard test battery and ballistic meter procedure.

The remote reversing switch arrangement described above has particular advantages in long telephone subscriber loops in which carrier techniques are utilized to concentrate a plurality of telephone talking paths on a single metallic pair. In this case, a separate metallic test path can be provided for all of the subscribed connected to the carrier system. The remote reversing switch and other test circuitry can then be shared by all the connected subscribers, thereby reducing the per subscriber cost of such testing arrangements.

A particular advantage of the arrangement of the present invention permits test personnel to test long subscriber loops, and loops connected to subscriber loop carrier systems, in the same manner as any other loop is tested. This simplifies the overall testing procedures and eliminates the need for special instructions for testing unusually long subscriber loops.

DETAILED DESCRIPTION OF THE DRAWING

Figure 1:
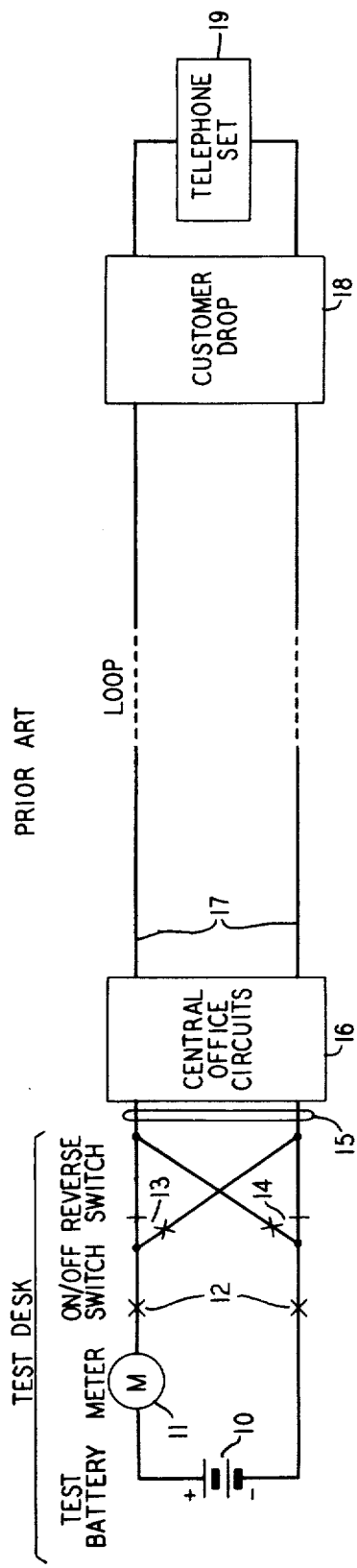
FIG. 1 is a simplified diagram of the prior art ballistic ringer testing circuit.

In FIG. 1 there is shown a simplified diagram of a conventional prior art ballistic ringer testing circuit. In FIG. 1, a test desk includes a test battery 10, a milliammeter 11 and a pair of switch contacts 12 for connecting battery 10 and meter 11 in series with a telephone loop 15. The test desk also includes contacts 13 and 14 which serve to reverse the polarity of the connection of battery 10 and meter 11 to conductor pair 15.

Conductors 15 from the test desk are connected through central office circuits 16 to a telephone subscriber loop 17 comprising a pair of conductors extending from the central office circuits 16 to a subscriber location including a customer drop 18. The telephone subscriber set 19 is connected to loop 17 by way of customer drop 18.

Telephone set 19 includes a conventional telephone ringer which is normally bridged across loop 17 to permit ringing in response to ringing signals applied at central office circuits 16. On a regularly scheduled maintenance basis, or in response to a trouble report from the customer, the test desk is connected through the central office circuits 16 to the subscriber loop 17. In order to test the ringer at telephone set 19, switch contacts 12 are operated to connect test battery 10 (e.g., 100V) and meter 11 to loop 17. After a brief interval during which loop 17 is fully charged by test battery 10, reversing contacts 13 and 14 are operated, causing the line 17 and the capacitance of the ringer at telephone set 19 to discharge completely and recharge in the opposite direction. The charging current can be read on meter 11 as a ballistic deflection of the meter pointer. Indeed, with practice, the peak meter deflection can be interpreted in terms of the number of telephone ringers connected to loop 17.

The ringer testing arrangement of FIG. 1 is adequate for all normal telephone loops. In a few cases, however, such as in rural areas, the length of loop 17 is so great that telephone ringers cannot be detected accurately at telephone set 19. That is, the capacitance of a telephone loop itself increases linearly with the length of the loop. At some point, the line capacitance becomes so great that the effect of a ringer at the remote end of the line is totally masked by the line capacitance. In this case, the presence of a ringer cannot be accurately determined from the test desk location using the testing arrangement of FIG. 1.

Figure 2:
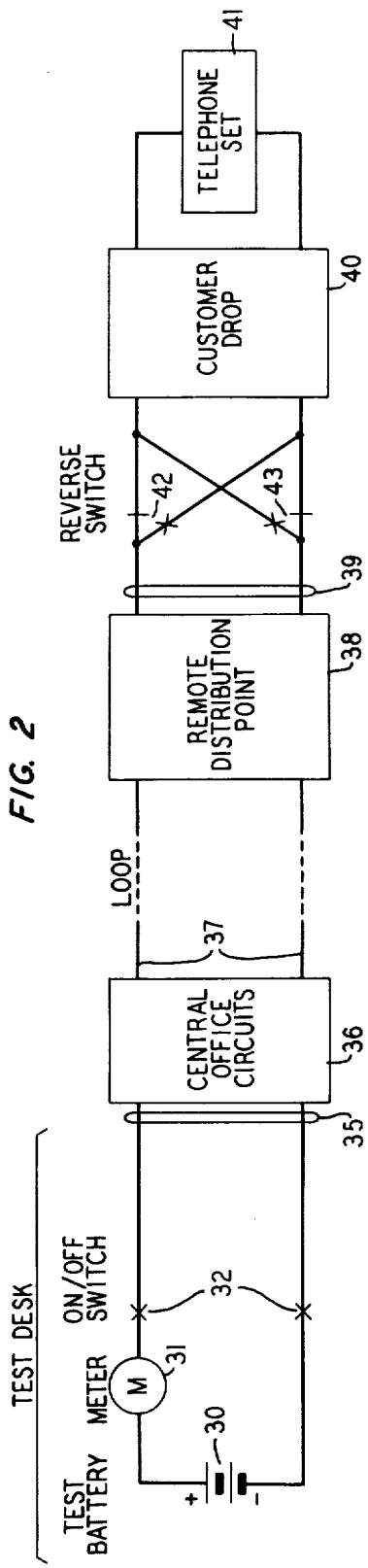
FIG. 2 is a simplified diagram of a ballistic ringer testing circuit in accordance with the present invention.

In FIG. 2 there is shown a simplified diagram of a ballistic ringer testing circuit in accordance with the present invention which is suitable for telephone loops of any length. Like the arrangement in FIG. 1, the test desk in FIG. 2 includes a test battery 30, a meter 31, and switch contacts 32. Contacts 32 serve to connect test battery 30 and meter 31 through conductor pair 35 to central office circuits 36. Central office circuits 36 include switching arrangements and distributing arrangements by means of which pair 35 can be connected to subscriber loop 37. Loop 37 can be of any length and, in particular, can exceed the twenty mile limitation beyond which the testing arrangement of FIG. 1 is no longer reliable.

At some remote location in loop 37, there is a remote distributing point 38 at which the cable or other facility in which loop 37 is located is connected to local distribution pairs 39. Distribution pairs 39 are connected to customer drop 40 and thence to the customer telephone set 41. Reversing contacts 42 and 43 are included in the local distribution pair 39 to increase the range of the ballistic ringer test. The sensitivity of the ballistic ringer test is increased since reversing contacts 42 and 43 need discharge only that portion of the customer's loop which extends beyond contacts 42 and 43. This portion of the loop is well within the sensitivity limits for ballistic testing. Moreover, the procedures which take place at the test desk in the central office location are indentical for the arrangement of FIG. 2 as they are for the arrangement of FIG. 1. In particular, the ballistic deflection of meter 31 can be interpreted in the same way in the arrangement of FIG. 2 as in FIG. 1.

Reversing switch contacts 42 and 43 can be operated in the arrangement of FIG. 2 by means of a signaling arrangement, not shown, initiated by a key at the test desk which signal is detected at the remote distribution point 38 and used to operate contacts 42 and 43. Alternatively, contacts 42 and 43 can be operated automatically in response to the detection of the test voltage from battery 30 by means of a direct current voltage detector, also not shown.

The arrangement of FIG. 2 has the advantage of being operable on telephone loops of any length. Moreover, the sensitivity of the test is independent of loop length and, in particular, the peak ballistic deflection can be interpreted as reflecting the number of telephone ringers connected at the subscriber location. The arrangement of FIG. 2 is particularly advantageous for long subscriber loops which are equipped with carrier facilities and, more particularly, where a large number of telephone subscribers share the same metallic path, using carrier multiplexing techniques. One such arrangement is shown in detail in FIG. 3.

Figure 3:
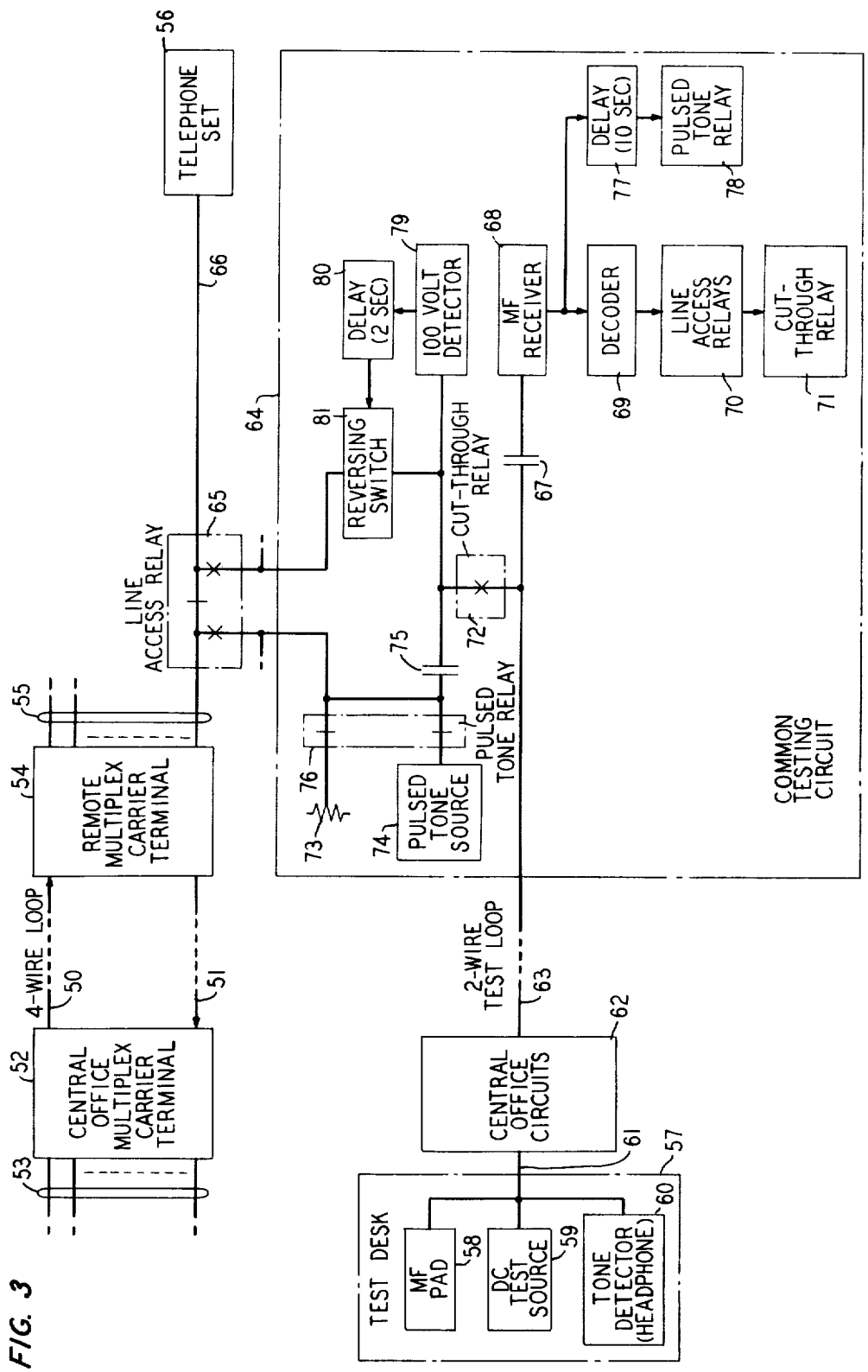
FIG. 3 is a detailed block diagram of a subscriber loop testing arrangement in conjunction with a subscriber loop carrier system and utilizing the improved ballistic ringer testing circuit in accordance with the present invention.

In FIG. 3 there is shown a subscriber loop testing arrangement for testing a plurality of telephone subscriber loops which share common conductor pairs 50 and 51. To this end, a central office multiplex carrier terminal 52 is used to concentrate telephone traffic from input lines 53 on pairs 50 and 51 using standard carrier technology. That is, terminal 52 provides a plurality of channels on pairs 50 and 51 which may be separated by frequency multiplexing techniques or in which voice signals are converted to pulse form and multiplexed on pairs 50 and 51 by time division multiplexing techniques. Either pulse code modulation (pcm) or delta modulation techniques can be used for this purpose. Moreover, lines 50 and 51 can include repeater stations to extend the length of the carrier path to any extent desired.

At the remote end of loops 50 and 51 is a remote multiplex carrier terminal 54 which receives the multiplexed signals from lines 50 and 51 and demodulates and demultiplexes these signals to present analog voice signals on a plurality of conductor pairs 55 equal in number to the conductor pairs 53 connected to the central office terminal.

A telephone subscriber, for example, as represented by telephone set 56, therefore receives and initiates telephone calls using the voice channel derived on lines 50 and 51 by carrier terminals 52 and 54. One such multiplex carrier system using pulse encoding and multiplex techniques is shown in J. L. Caldwell U.S. Pat. No. 3,963,869, granted June 15, 1976, and assigned to applicant's assignee. Supervisory signaling arrangements for such a system are disclosed in the copending application of R. J. Canniff-M. T. Manfred, Ser. No. 659,369, filed Feb. 19, 1976, and assigned to applicant's assignee.

The subscriber loop testing arrangement of FIG. 3 includes a local test desk 57 including a multifrequency tone generator 58, direct current test signal source 59, and a tone detector 60 which may comprise a standard telephone receiver. Test desk 57 is connected by way of line 61 to central office circuits 62 which include the switching and distributing arrangements similar to circuits 16 and 36 in FIG. 1 and 2, respectively. Central office circuits 32 are connected to a metallic test path 63 extending in parallel with lines 50 and 51 to a common testing circuit 64 in the vicinity of the remote carrier terminal 54. Line access relay contacts similar to contacts 65 serve to selectively connect local telephone loops such as loop 66 to testing circuit 64. Loop 66 is split in order to provide separate access to remote terminal 54 and to the telephone set 56. In this way, testing can be accomplished outwardly toward telephone set 56 and inwardly through the carrier terminals to the central office appearances 53. Each of local loops 55 can be connected to common test circuit 64 through access circuits similar to contacts 65. Testing circuits 64 are shared by all the telephone loops 66 connected to the carrier system.

Access to the local telephone loops through the line access relay contacts similar to contacts 65 is accomplished using the dedicated metallic test path 63. Multifrequency tones generated in multifrequency source 58 are transmitted on line 63 through capacitor 67 to multifrequency receiver 68. The detected multifrequency tones are decoded in decoder 69 to operate the identified one of the line access relays 70. The operated line access relay will, of course, operate contacts corresponding to contacts 65 to make the test connection. Following the operation of the appropriate line access relay 70, a common cut-through relay 71 is operated to close contacts 72 and connect the test circuits to the dedicated test line 63.

When testing circuit 64 is connected, a bridging termination 73 is connected across the local loop facing the remote carrier terminal to simulate a subscriber going offhook. In response to this offhook indication, the central office applies dial tone to the appropriate appearance 53. This dial tone is transmitted through the carrier system to the common testing circuit 64, through capacitor 75 and thence back through the test line 63 to central office circuit 62 and to detector 60. The presence of dial tone at detector 60 indicates proper operation of the carrier portion of the subscriber loop.

A pulsed tone source 74 in common testing circuit 64 is also connected through capacitor 75 and contacts 72 to the test loop 63. Source 74 is interrupted at a rate that permits detection of dial tone during the silent intervals. It is therefore possible to separately test the connections between common testing circuit 64 and the central office location, e.g., the carrier channel and the test line 63. Normally closed contacts 76 connect termination 73 and pulse tone 74 to capacitor 75. A delay circuit 77 is connected to the output of multifrequency receiver 68 and responds to the output from receiver 68 to operate pulsed tone relay 78 after a delay of approximately ten seconds. This permits the artificial termination 73 and the pulse tone source 74 to remain bridged on the test line for a sufficient length of time to permit personnel at the test desk 57 to ascertain proper operation of the alternating current portions of the carrier system as well as test loop 63. Thereafter, contacts 76 open and the local loop is available for further tests.

At this time, the test operator may operate a contact in dc test source 59 similar to contacts 12 and 32 in FIG. 1 and 2, respectively, to connect a test battery and a meter to line 61. The voltage from the test battery is detected in common testing circuit 64 by detector 79. After a delay of approximately two seconds, supplied by delay circuit 80, reversing switch contacts 81 are operated to reverse the polarity of the conductors 66 extending to telephone set 56. Local loop 66 is therefore discharged and the meter at dc test source 59 can be observed to ascertain the presence of a ringer in telephone set 56. Due to the relatively short length of loop 66, a ringer can be accurately detected and, indeed, the number of ringers connected to local loop 66 can be ascertained. The long loop 63, once discharged, need not be charged when contacts 81 are operated.

If desired, after another period of a few seconds, reversing switch 81 can be released to provide another ballistic indication of the ringers on loop 66. Thereafter, other standard subscriber loop tests can be performed using loop 63 and the concentration through common testing circuit 64 and line access relay contacts 65. In particular, short circuits on the line can be detected as well as leakage current and the presence of foreign voltages. A noise indication can be derived from detector 60. In particular, if detector 60 is a telephone receiver, the operator can listen to the noise level on the line.

It can be seen that the arrangement of FIG. 3 provides remote ballistic testing of ringers on long subscriber loops. Moreover, this and other subscriber loop tests are carried out by means of common testing circuit 64 and the common test line 63, thereby reducing the per subscriber cost of such testing arrangements. With the arrangement of FIG. 3, these tests can be carried out regardless of the length of loops 50, 51, and 63 using standard testing procedures with which the test desk personnel are familiar.

What is claimed is:

1. A ringer continuity test circuit for a telephone loop comprising
    a source of direct current test voltage at a central location;
    a line reversal switch connected in said telephone loop at a location remote from said central location;
    means for operating said line reversal switch: and
    metering means for indicating current level changes in said loop.

2. The ringer continuity test circuit of claim 1 wherein
    said means for operating said line reversal switch includes means responsive to said direct current test voltage.

3. A ringer continuity test circuit for a subscriber loop carrier system comprising
    a source of direct current test voltage at a central location;
    a metallic test path from said central location to the remote terminal of said carrier system;
    means for selectively connecting said metallic test path to a local subscriber loop at said remote terminal;
    line reversal means in said metallic test path at said remote terminal location; and
    means for detecting current changes in said metallic test path.

4. The ringer continuity test circuit according to claim 3 wherein
    said line reversal means includes means responsive to said direct current test voltage to reverse the connection to said local subscriber loop after a preselected delay interval.

5. The ringer continuity test circuit according to claim 3 further including
    a multifrequency line identification signal source; and
    multifrequency detector means responsive to signals from said multifrequency source for enabling said selective connecting means.

6. A testing system for telephone lines connected to a central office through a carrier system comprising
    a test desk including a current detector at the central office end of said carrier system;
    a common loop testing circuit at the remote end of said carrier system;
    a metallic path extending from said test desk to said common loop testing circuit; and
    line reversal means in said common loop testing circuit.

7. The testing circuit according to claim 6 further including
    means for selectively connecting metallic telephone loops at said remote end of said carrier system to said common loop testing circuit.

8. The testing circuit according to claim 7 further including
    means responsive to said selective connecting means for interposing said common loop testing circuit between said metallic telephone loops and said carrier system; and
    means utilizing said metallic path for conducting alternating current tests of said carrier system.

* * * * *